(12) United States Patent
Luker

(10) Patent No.: US 11,155,119 B2
(45) Date of Patent: Oct. 26, 2021

(54) TRACTION WHEEL APPARATUS WITH NON-UNIFORM TREAD TEETH

(71) Applicant: Gregory W. Luker, Bountiful, UT (US)

(72) Inventor: Gregory W. Luker, Bountiful, UT (US)

( * ) Notice: Subject to any disclaimer, the term of this patent is extended or adjusted under 35 U.S.C. 154(b) by 403 days.

(21) Appl. No.: 16/100,136

(22) Filed: Aug. 9, 2018

(65) Prior Publication Data
US 2018/0345720 A1 Dec. 6, 2018

Related U.S. Application Data

(62) Division of application No. 14/214,006, filed on Mar. 14, 2014, now abandoned.

(60) Provisional application No. 61/784,263, filed on Mar. 14, 2013.

(51) Int. Cl.
| | |
|---|---|
| *B60B 15/00* | (2006.01) |
| *B60B 15/26* | (2006.01) |
| *B62D 49/06* | (2006.01) |
| *B60B 39/00* | (2006.01) |

(52) U.S. Cl.
CPC .............. *B60B 15/00* (2013.01); *B60B 15/26* (2013.01); *B62D 49/0635* (2013.01)

(58) Field of Classification Search
CPC ....... B60B 11/10; B60B 15/18; B60B 15/266; B60B 15/00; B60B 15/26; B60B 15/263; B60B 39/00; B62D 49/0635
USPC ............ 180/15, 16; 301/40.1, 40.6, 43, 44.3
See application file for complete search history.

(56) References Cited

U.S. PATENT DOCUMENTS

| | | | | |
|---|---|---|---|---|
| 577,273 | A | * | 2/1897 | Swanstrom |
| 652,650 | A | * | 6/1900 | Stone |
| 880,122 | A | * | 2/1908 | Bucey |
| 893,867 | A | * | 7/1908 | Pereyta |
| 1,083,886 | A | | 1/1914 | Marston |
| 1,102,598 | A | * | 7/1914 | Liska ..................... B60B 15/025 |
| | | | | 301/40.1 |
| 1,260,213 | A | * | 3/1918 | Landrin .................. B60B 15/02 |
| | | | | 301/43 |
| 1,337,672 | A | * | 4/1920 | Steele ................ B62D 49/0621 |
| | | | | 180/15 |

(Continued)

FOREIGN PATENT DOCUMENTS

| | | |
|---|---|---|
| DE | 19519670 A1 | 10/1995 |
| EP | 2369065 A1 | 9/2011 |

(Continued)

*Primary Examiner* — Anne Marie M Boehler
(74) *Attorney, Agent, or Firm* — Kunzler Bean & Adamson

(57) ABSTRACT

The present disclosure relates to a wheel apparatus that includes a rim module coupleable to an axle and a solid tire module that extends from the rim module. The solid tire module includes a plurality of tread teeth that form a peripheral edge. The peripheral edge forms at least a portion of a tire profile. Each tread tooth of the plurality of tread teeth has a spatial specification that includes a circumferential width, a radial height, an edge shape, and a circumferential gap width. The spatial specifications of the plurality of tread teeth are non-uniform. In one embodiment, the solid tire module has a non-circular rotational trace. In another embodiment, at least a circumferential region of the peripheral edge comprises a sequence of tread teeth having sequentially increasing radial height.

5 Claims, 10 Drawing Sheets

(56) References Cited

U.S. PATENT DOCUMENTS

| | | | |
|---|---|---|---|
| 1,344,512 A | 6/1920 | Julien | |
| 1,576,379 A | 3/1926 | Turner | |
| 1,703,070 A | 2/1929 | Barshell | |
| 1,780,404 A | 11/1930 | Schooling | |
| 2,188,196 A | 1/1940 | Wanek | |
| 2,227,638 A | 1/1941 | Faltisek | |
| 2,240,542 A | 5/1941 | Bourdon | |
| 2,403,812 A | 7/1946 | MacCallum | |
| 2,544,774 A * | 3/1951 | Bredl | B62D 49/0635 180/15 |
| 2,668,391 A | 2/1954 | Huard et al. | |
| 2,790,503 A | 4/1957 | Kopczynski | |
| 3,004,578 A | 10/1961 | Braudorn | |
| 3,142,350 A * | 7/1964 | Flint | B60S 9/18 180/203 |
| 3,372,766 A | 3/1968 | Lifferth | |
| 3,712,359 A | 1/1973 | Williams | |
| 3,826,322 A * | 7/1974 | Williams | B60K 1/00 180/202 |
| 4,204,583 A | 5/1980 | Toyoura et al. | |
| 4,223,912 A | 9/1980 | Reyes | |
| 4,265,289 A | 5/1981 | Pommier | |
| 4,432,427 A | 2/1984 | Van Der Lely | |
| 4,575,354 A | 3/1986 | Wakayama et al. | |
| 4,598,783 A | 7/1986 | Tippen | |
| 4,735,038 A | 4/1988 | Williams | |
| 4,817,747 A | 4/1989 | Kopczynski | |
| 4,821,824 A | 4/1989 | Gilbert | |
| 5,287,938 A | 2/1994 | Welling | |
| 5,618,219 A | 4/1997 | Simone et al. | |
| 5,881,831 A | 3/1999 | Harvey | |
| 6,557,660 B2 | 5/2003 | Averill et al. | |
| 6,604,589 B2 | 8/2003 | Sepitka | |
| 6,719,027 B1 | 4/2004 | Chen | |
| 7,128,175 B1 * | 10/2006 | Martineau | B60F 3/0007 180/7.1 |
| 7,503,567 B2 | 3/2009 | Frankie | |
| 7,546,890 B2 | 6/2009 | Grobler | |
| 7,976,064 B2 | 7/2011 | Abdulaev | |
| 8,002,294 B2 | 8/2011 | Brandeau | |
| 2003/0066701 A1 | 4/2003 | Averill et al. | |
| 2008/0252135 A1 | 10/2008 | Mills et al. | |
| 2010/0152922 A1 | 6/2010 | Carlson et al. | |
| 2012/0138377 A1 | 6/2012 | Pierce | |

FOREIGN PATENT DOCUMENTS

| | | |
|---|---|---|
| FR | 558482 A | 8/1923 |
| FR | 2580554 A1 | 10/1986 |
| GB | 460133 A | 1/1937 |
| GB | 2248428 | 4/1992 |

\* cited by examiner

TRACTION WHEEL APPARATUS WITH NON-UNIFORM TREAD TEETH

CROSS-REFERENCES TO RELATED APPLICATIONS

This application claims the benefit of U.S. Provisional Patent Application No. 61/784,263, filed Mar. 14, 2013, which is incorporated herein by reference.

FIELD

The subject matter of the present disclosure relates generally to tires and more particularly to solid tires with non-uniform tread teeth.

BACKGROUND

Tires are very important to the operation of vehicle. Regardless of how much power is generated by an onboard motor or how much energy is stored in an onboard power supply, the only way to utilize that power to propel the vehicle is to convert that power into a force that moves the vehicle. The magnitude of acceleration force that a vehicle is able to achieve is directly proportional to the force the tires impart to the terrain upon which the vehicle is driving. In other words, the traction of a vehicle's tires greatly influences the ability of the vehicle to do work (i.e., move the vehicle)

Conventional vehicles usually ride on round, pneumatic tires. Such conventional tires generally have a tread pattern that improves the tires' grip to the terrain, thus providing sufficient traction to vehicles that drive on improved roads, such as asphalt and cement roads. However, when such tires are incorporated with vehicles that are used in off-road situations (i.e., off-road terrain such as inclined terrain and/or terrain with rocks, mud, snow, sand, debris, and other obstacles), the tires quickly lose traction and the vehicle is unable to effectively traverse the off-road terrain.

Certain conventional solutions involve implementing tires with extreme tread patterns. While these tread patterns may slightly enhance traction, the increase in traction is at the cost of fuel economy on improved roads. Other conventional solutions include implementing tracks that are formed from a continuous band of tread plates, such as modular steel plates, that is rotated by two or more internal wheels. While such track systems increase traction, they are often heavy, complex, and excessively expensive. Additionally, conventional track systems are often difficult to build and maintain.

SUMMARY

From the foregoing discussion, it should be apparent that a need exists for a tire apparatus and system that overcome the limitations of conventional tire and traction assemblies. Beneficially, such an apparatus and system would provide a cost-effective manner to provide increased traction to a vehicle.

The subject matter of the present application has been developed in response to the present state of the art, and in particular, in response to the problems and needs in the art that have not yet been fully solved by currently available traction assemblies. Accordingly, the present disclosure has been developed to provide a tire apparatus and system that overcome many or all of the above-discussed shortcomings in the art.

The present disclosure relates to a wheel apparatus that includes a rim module coupleable to an axle and a solid tire module that extends from the rim module. The solid tire module includes a plurality of tread teeth that form a peripheral edge. The peripheral edge forms at least a portion of a tire profile. Each tread tooth of the plurality of tread teeth has a spatial specification that includes a circumferential width, a radial height, an edge shape, and a circumferential gap width. The spatial specifications of the plurality of tread teeth are non-uniform. In one embodiment, the solid tire module has a non-circular rotational trace. In another embodiment, at least a circumferential region of the peripheral edge comprises a sequence of tread teeth having sequentially increasing radial height.

According to one implementation, the peripheral edge of the solid tire module has a first circumferential region and a second circumferential region. The first circumferential region may have tread teeth that have a first average radial height and the second circumferential region may have tread teeth that have a second average radial height. In one embodiment, the first average radial height is at least 1.5 times the second average radial height. In another embodiment, the peripheral edge of the solid tire module has a first circumferential region and a second circumferential region, wherein the first circumferential region has tread teeth and the second circumferential region is substantially lacking tread teeth.

In one embodiment, the solid tire module is detachably coupled to the rim module. The apparatus may further include at least one wing extending axially from at least one side of the solid tire module, wherein each wing comprises an axial breadth. The at least one wing includes a sequence of wings having sequentially increasing axial breadth. Further, the apparatus may include terrain gripping features on one or more of the tread teeth. In another embodiment, the rim module may be attached to an existing wheel rim. Bores or holes may extend axially through the solid tire module for balance or weight reduction purposes.

The present disclosure also relates to a wheel system that includes a terrain engagement subsystem mountable to a vehicle. The terrain engagement subsystem includes a power module operably connectable with a power source, wherein the power module is engaged with an axle that is rotatably driven via the power module. The axle may include other components, such as weight bearing hubs or gear-assembly hubs. The system further includes an actuation mechanism that controls whether a wheel apparatus is in drive-mode or passive-mode. Still further the system includes a wheel apparatus that includes a rim module coupled to the axle and a solid tire module that extends from the rim module. The solid tire module includes a plurality of tread teeth that form a peripheral edge. The peripheral edge forms at least a portion of a tire profile. Each tread tooth of the plurality of tread teeth has a spatial specification that includes a circumferential width, a radial height, an edge shape, and a circumferential gap width. The spatial specifications of the plurality of tread teeth are non-uniform. In one embodiment, the solid tire module has a non-circular rotational trace. In another embodiment, at least a circumferential region of the peripheral edge comprises a sequence of tread teeth having sequentially increasing radial height.

The rim module of the wheel system of claim may actually be a first rim module and the solid tire module may actually be a first solid tire module, the wheel system further including a second rim module and a second solid tire module that has a plurality of tread teeth that form a peripheral edge, wherein each tread tooth of the plurality of tread teeth has a spatial specification that includes a circumferential width, a radial height, an edge shape, and a circumferential gap width, wherein the spatial specifications of the plurality of tread teeth are non-uniform.

The spatial specification of the plurality of tread teeth of the first solid tire module are, according to one embodiment, substantially the same as, and aligned with, the spatial specification of the plurality of tread teeth of the second solid tire module. In another embodiment, the spatial specification of the plurality of tread teeth of the first solid tire module are substantially the same as, but counter-aligned with, the spatial specification of the plurality of tread teeth of the second solid tire module. Further, the system may include at least one paddle axially extending between the first and second solid tire modules.

In one embodiment, the actuation mechanism of the terrain engagement-subsystem includes an extension arm that extends the solid tire module into contact with terrain in drive-mode and retracts the solid tire module from contact with the terrain in passive-mode. In another embodiment, the extension arm positions the solid tire module between existing axles of the vehicle.

The present disclosure further relates to a controller apparatus that includes a rotational trace module that receives spatial dimensions regarding non-circular wheel apparatuses attached to a vehicle and generates rotational trace data. The controller apparatus further includes a rotational analysis module that receives the rotational trace data and generates a reduced oscillation strategy. The controller apparatus further includes an actuation module that receives the reduced oscillation strategy and sends actuation commands to a powertrain system of the vehicle.

In one embodiment, the controller apparatus further may include a traction feedback module and a traction analysis module, wherein the traction feedback module detects powertrain conditions and sends a powertrain condition report to the traction analysis module and the traction analysis module receives the powertrain condition report and generates a traction control strategy. The actuation module considers the reduced oscillation strategy and the traction control strategy when sending actuation commands to the powertrain system.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Furthermore, the described features, structures, or characteristics of the disclosure may be combined in any suitable manner in one or more embodiments. In the following description, numerous specific details are provided. One skilled in the relevant art will recognize, however, that the subject matter of the present application may be practiced without one or more of the specific details, or with other methods, components, materials, and so forth. In other instances, well-known structures, materials, or operations are not shown or described in detail to avoid obscuring aspects of the disclosure.

Figure 1:
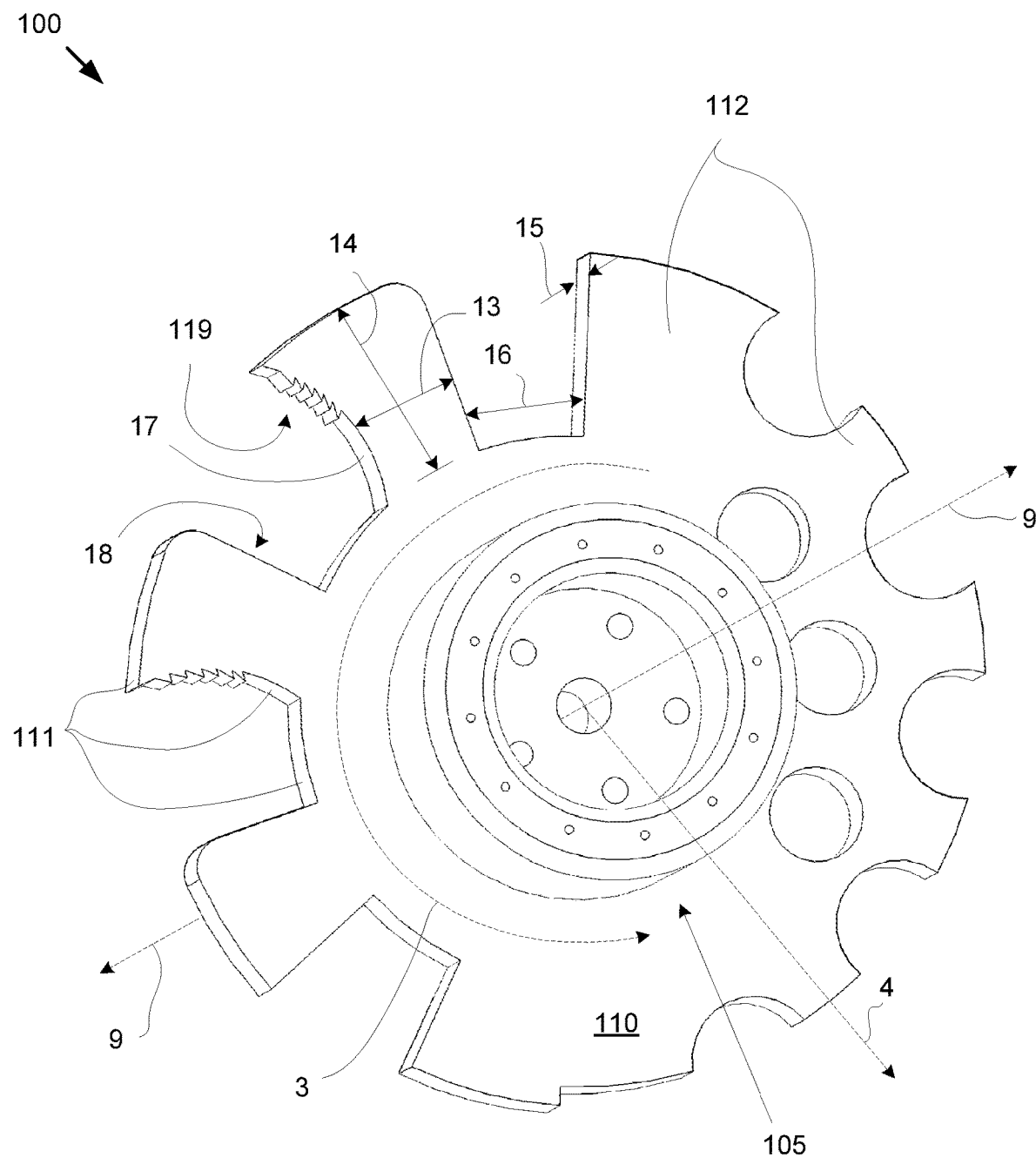
FIG. 1 is a perspective view of one embodiment of a wheel apparatus showing a rim module and a solid tire module.

FIG. 1 is a perspective view of one embodiment of a wheel apparatus 100 showing a rim module 105 and a solid tire module 110. As described above, conventional vehicles usually ride on round, pneumatic tires. Such conventional tires generally have a tread pattern that improves the tires' grip to the terrain, thus providing sufficient traction to vehicles that drive on improved roads, such as asphalt and cement. However, when such tires are incorporated with vehicles that are used in off-road situations (i.e., off-road terrain such as inclined terrain and/or terrain with rocks, mud, snow, sand, debris, and other obstacles), the tires quickly lose traction and the vehicle is unable to effectively traverse the off-road terrain.

The wheel apparatus 100 of the present disclosure generally includes at least one solid tire module 110 that is attached to a rim module 105. According to one embodiment, the rim module 105 and the solid tire module 110 are formed from a single unitary material and are thus integrated together. In another embodiment, the rim module 105 and the solid tire module 110 are detachably coupled together. Accordingly, the use of the language "attaches to" or "couples to" does not limit the disclosure to applications in which the rim module 105 is separable from the solid tire module 110. The construction material of the rim module 105 and the solid tire module 110 may be metal, composite, plastic, rubber, or other strong material capable of withstanding the anticipated wear of a certain off-road application. In one embodiment, the wheel apparatus 100 may be a retro-fit application that is installable on an existing vehicle. In another embodiment, the wheel apparatus 100 may be implemented by an original manufacture as part of a new product.

The rim module 105 is the central mounting structure from which the solid tire module 110 extends. In one embodiment, as depicted, the rim module 105 is a hole, mounting plate, mounting holes region, or axial protrusion that can engage an axle of a vehicle. The rim module 105 may attach to an existing wheel rim (see FIG. 9) or the rim module 105 may be a stand-alone rim attachable to an axle. Although described in greater detail below, the rim module 105 may be attached to an existing axle on a vehicle or the rim module 105 may be implemented with an independent axle that is separate from existing axles on the vehicle. The term "axle" throughout the present disclosure refers to a rotating body controlled by a motor (see the description below with reference to FIGS. 6 and 7). Further, the axle may include or be operably connected to a hub that may contain a gearing assembly and/or clutch that is coupled to the rim module 105. The hub may be specifically designed and included to support most of the weight of the vehicle. Thus, the rim module 105 may be connected to a traditional axle or the rim module 105 may be a mount that is welded or bolted on to an existing wheel/rim (see the description below with reference to FIG. 9). Further, the term axle may refer to a drive-shaft extending from a geared hub assembly.

The solid tire module 110 includes a plurality of non-uniform tread teeth 112 that form a peripheral edge 111. Although described in greater detail below with reference to the various figures and embodiments, the non-uniformity of the plurality of tread teeth 112 improve the traction of the wheel apparatus 100 when compared to conventional tires, thus increasing the traction and enabling a vehicle to traverse off-road terrain and other off-road obstacles that would otherwise be difficult, if not impossible, to traverse.

The peripheral edge 111 of the solid tire module 110 constitutes at least a portion of a tire profile. The tire profile is the 360 degree shape of a tire, as shown in a radial cross-section of the tire. In other words, in one embodiment the solid tire module 110 has tread teeth 112 that extend 360 degrees around the rim module 105 and thus the peripheral edge 111 is the same as the tire profile. However, in other embodiments, the solid tire module 110 includes only an arced section of tread teeth 112 that does not form a complete 360 degree shape (see FIG. 9). In such embodiments, the solid tire module 110 can be attached to an existing tire/wheel (via the rim module 105), thus making the tire profile a combination of the peripheral edge 111 of the solid tire module 110 and the outer periphery of the existing tire tread (see description of FIG. 9).

Throughout the present disclosure, the terms "axial", "radial", and "circumferential" (and derivatives thereof) are used to describe various directions. Although the meaning of such terms may be inherent, the axial direction 9, the radial direction 4, and the circumferential direction 3 are shown in FIG. 1. These directions 3, 4, 9 are used to describe the spatial specifications of the individual tread teeth 112. In other words, each tread tooth 112 can be described in terms of its radial height 14, circumferential width 13, axial thickness 15, and edge shape. The spatial specification of each tread tooth 112 further includes the circumferential gap width 16 between two adjacent tread teeth.

As mentioned above, the plurality of tread teeth 112 are non-uniform. In other words, the spatial specifications of the tread teeth 112 are not constant. For example, in one embodiment the non-uniformity is due to at least one of the tread teeth 112 having a radial height 14 that is different than the other tread teeth 112. In another embodiment, the circumferential gap 16 between adjacent tread teeth 112 varies, thus making the spacing and distribution of the tread teeth 112 non-uniform. In yet another embodiment, the circumferential width 13 or the axial thickness 15 of at least one tread tooth is different than the circumferential width 13 or axial thickness 15 of the other tread teeth 112. In other words, the non-uniformity of the tread teeth 112 may be caused by a single tread tooth that has a single dimension (height, width, etc) that is different than the other tread teeth or the non-uniformity can be caused by various tread teeth having various spatial specifications that differ from each other.

Additionally, each tread tooth 112 has a front surface 17 and a rear surface 18. The front surface 17 is the axially extending surface directed towards (i.e., facing) the terrain/ground when the wheel apparatus 100 is rotating to move the vehicle forwards and the rear surface 18 is the axially extending surface directed towards the terrain/ground when the wheel apparatus 100 is rotating in the opposite direction to move the vehicle backwards. In one embodiment, the surfaces 17, 18 of the tread teeth 112 (or at least a portion of the tread teeth) may be serrated or have other terrain gripping features (such as spikes, bumps, rubber, etc.—dependent on the anticipated terrain), to increase traction of the apparatus 100. In another embodiment, the surfaces 17, 18 of the tread teeth 112 (or at least a portion of the tread teeth) may have curved shape (as depicted) that serves as a terrain gripping feature to further enhance the solid tire module's 110 ability to gain traction on the terrain. In certain embodiments, it may be beneficial to have terrain gripping features, such as replaceable carbide spikes, not only on the front surface 17 for climbing and traversing terrain but on the rear surface 18 of the tread teeth 112 to provide a degree of traction when the occasion requires the vehicle to reverse or back-down an incline.

Figure 6:
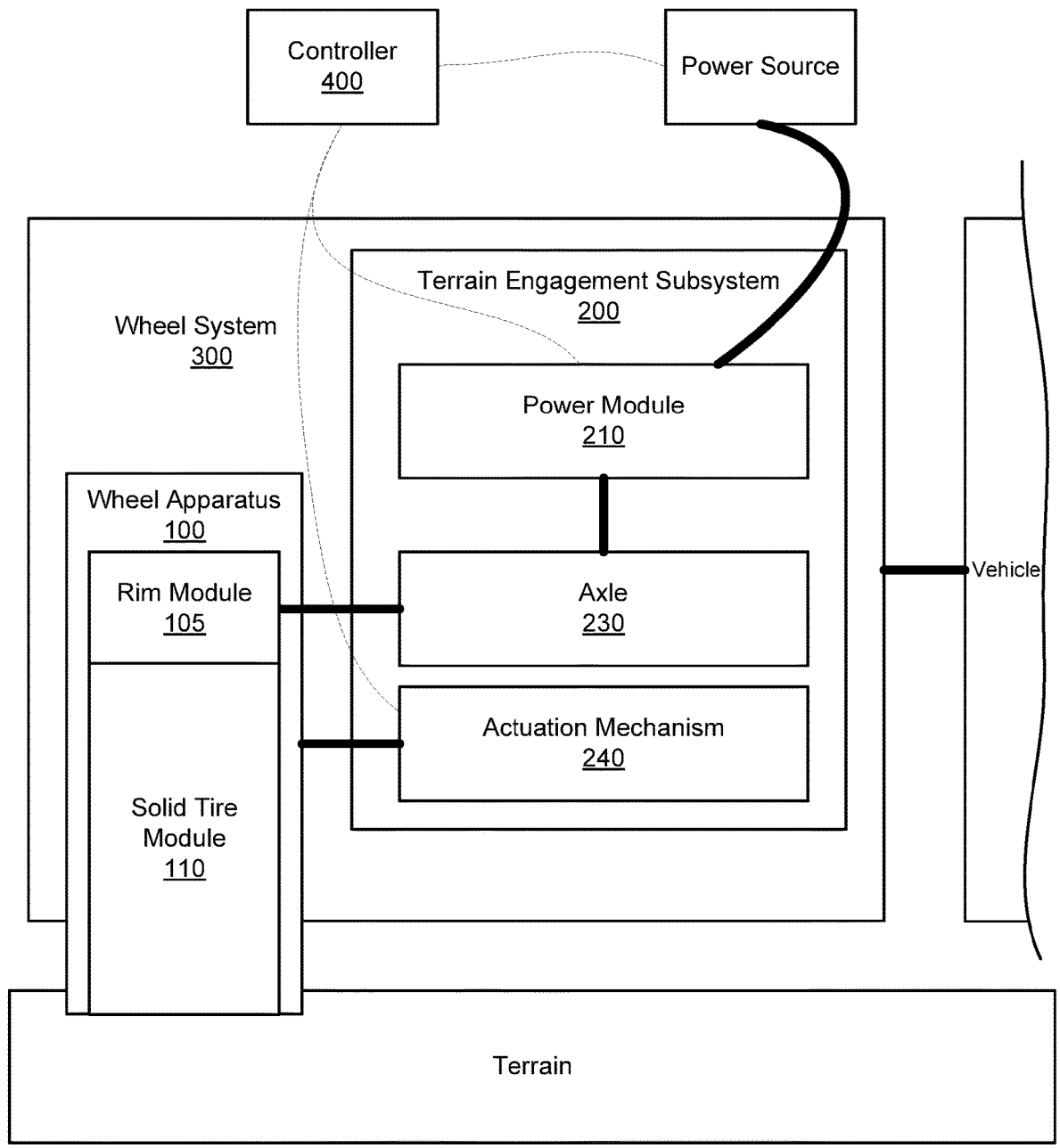
FIG. 6 is schematic block diagram of one embodiment of a wheel system coupleable to a vehicle.
Figure 7:
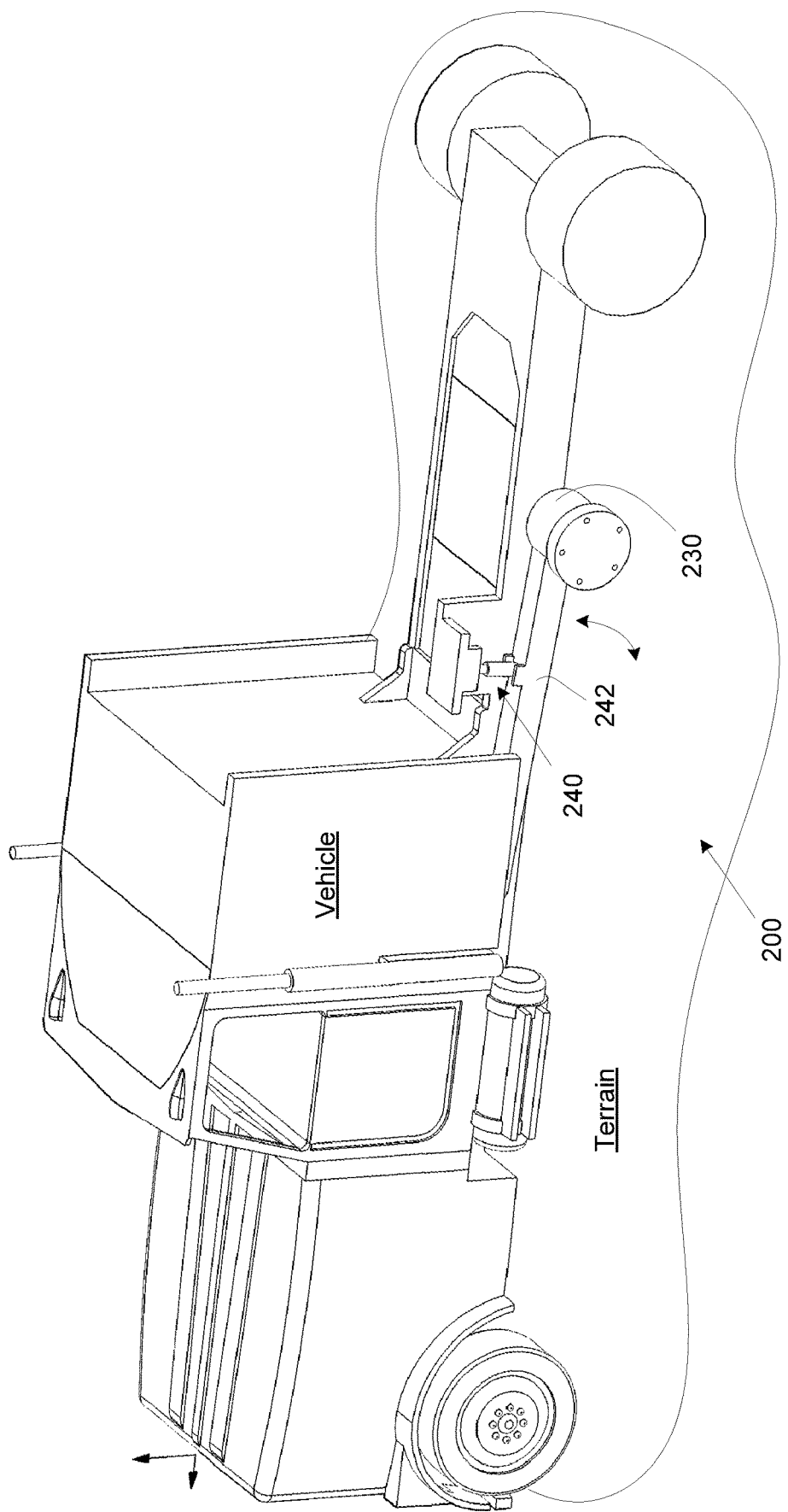
FIG. 7 depicts one embodiment of a terrain engagement subsystem coupled to a vehicle.
Figure 9:
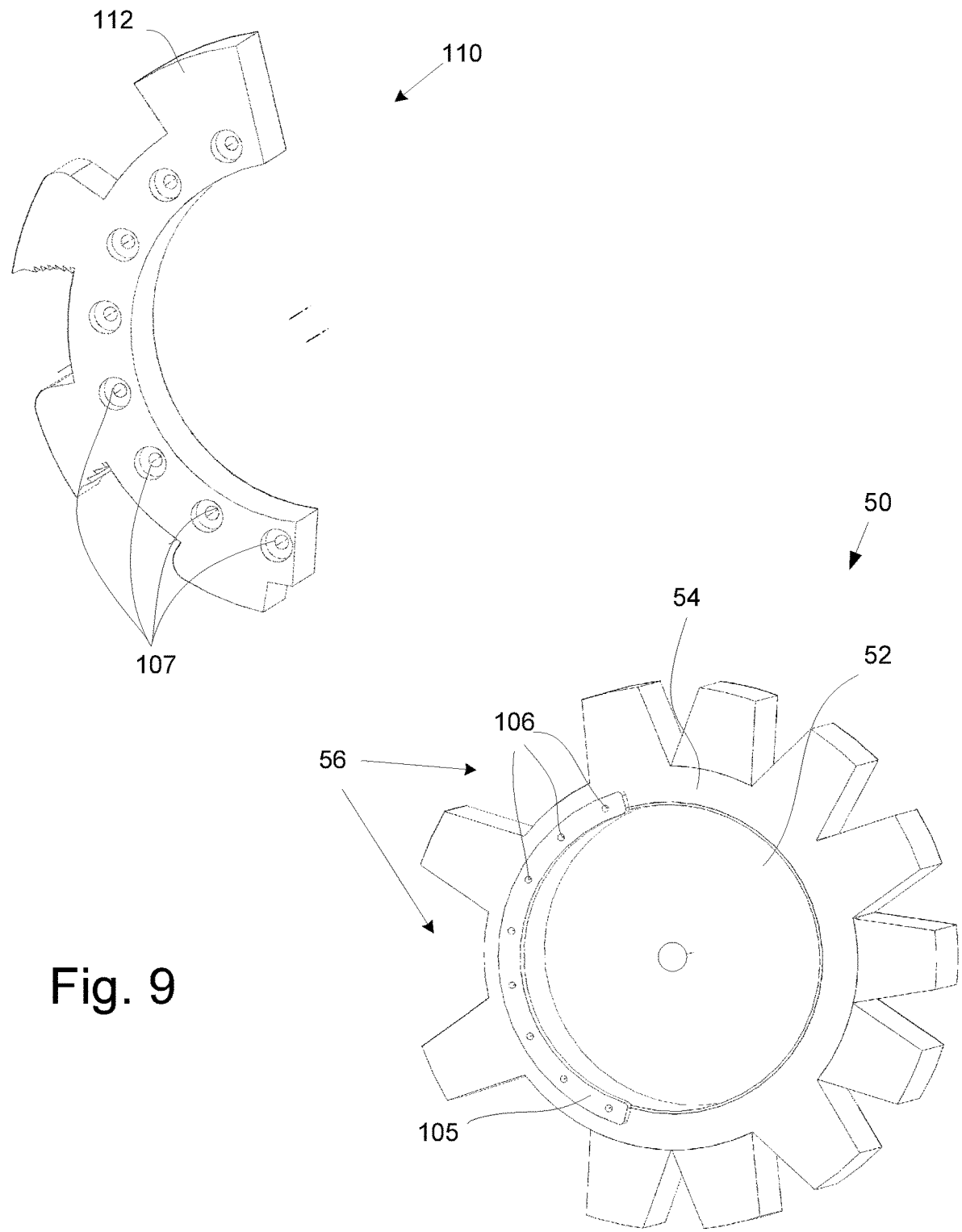
FIG. 9 is a perspective view of one embodiment of a solid tire module that can be attached to a rim module that is attached to an existing wheel.

FIGS. 2-5 depict various embodiments of the wheel apparatus 100 and provide additional details regarding the solid tire module 110. FIGS. 6-7 depict various embodiments of a wheel system 300 that is coupleable to a vehicle. FIG. 9 further include details regarding one example of a retro-fit implementation of the system 300. The description of FIG. 10 includes details regarding a controller apparatus for controlling the wheel system 300.

Figure 2:
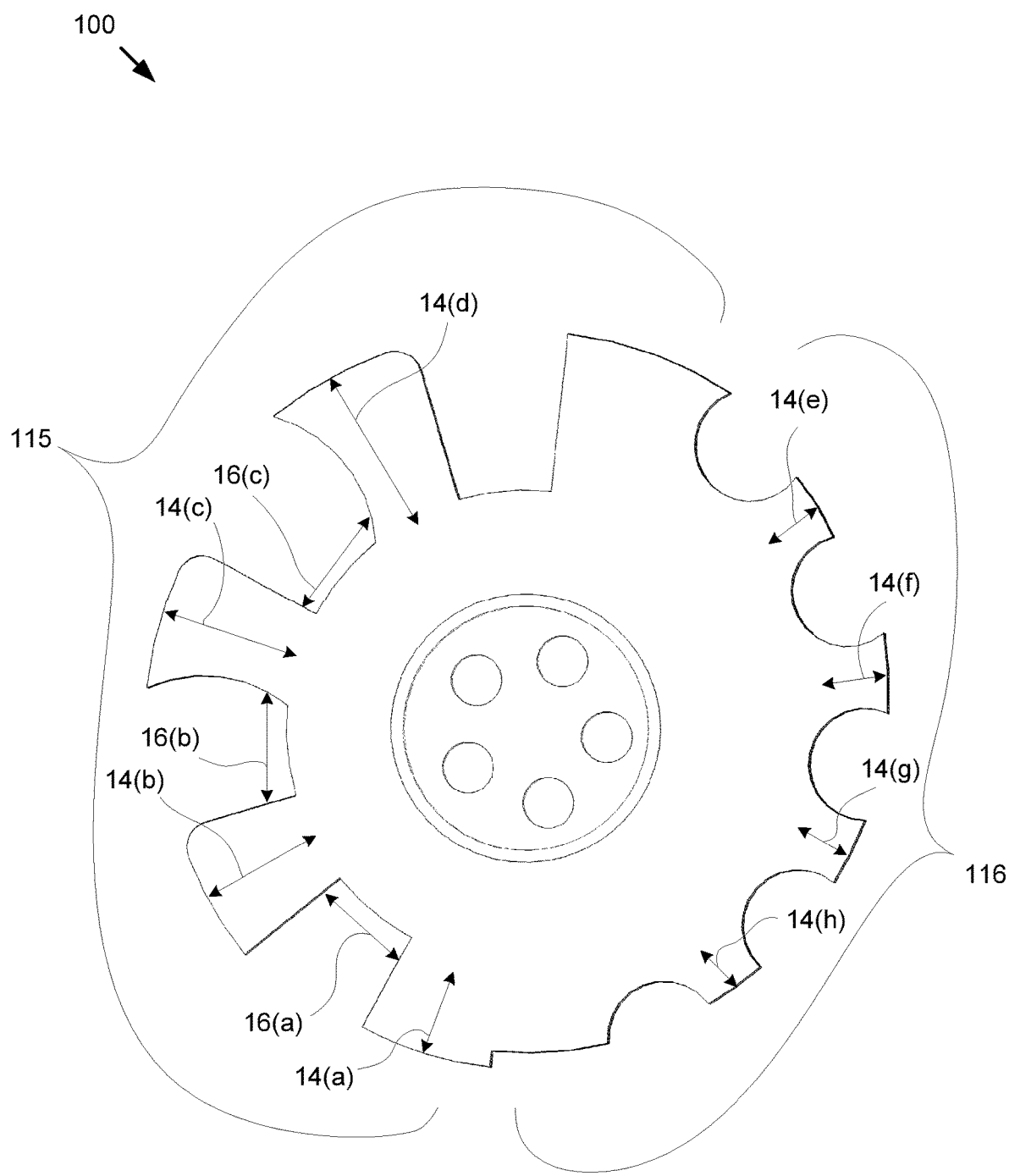
FIG. 2 is a side view of another embodiment of a wheel apparatus showing two circumferential regions of tread teeth.

FIG. 2 is a side view of another embodiment of a wheel apparatus 100 showing two circumferential regions 115, 116 of tread teeth 112. In one embodiment, the solid tire module 110 may include multiple circumferential regions 115, 116, wherein each circumferential region includes tread teeth 112 that have a certain spatial specification that, although not necessarily uniform throughout the entire region, is, on average, substantially different than another region. For example, the first circumferential region 115 depicted in FIG. 1 has tread teeth that have, on average, 1.5 times the radial height 14(a)-14(d) as the tread teeth 14(e)-14(h) in the second circumferential region 116. In another embodiment, the spatial specification that is averaged may be circumferential gap width or circumferential width instead of radial height. The difference multiplier between the average spatial specifications may be greater or less than 1.5. In yet another embodiment, the solid tire module 110 includes transition regions where the spatial specification of the tread teeth (e.g., radial height 14) transitions between the two averaged regions.

FIG. 2 also shows how the spatial specifications within each region 115, 116 may be different. In one embodiment, the radial height 14 of the tread teeth 112 in the first circumferential region 115 may sequentially increase. For example, the radial height 14(b) of a second tread tooth in the region 115 is longer than the radial height 14(a) of the first tread tooth in the region 115, the radial height 14(c) of a third tread tooth in the region 115 is longer than the radial height 14(b) of the second tread tooth, and so on. Thus, as the wheel apparatus 100 is rotated in a forward direction, the axial height 14 of the tread teeth (in the first region 115) sequentially increases, thus enabling the apparatus 100 to sequentially gain more traction or at least sequentially obtain a better hold on the terrain. For example, when using the wheel apparatus 100 to climb a steep terrain or surmount an obstacle in the pathway of a vehicle, the sequentially increasing radial height 14 of the teeth may enhance the tire module's 110 ability to steadily gain traction (instead of spinning out as a conventional tire would). Once again, the spatial specification that sequentially changes may be radial height 14, circumferential width 13, circumferential gap width 16, axial thickness 15, or a combination thereof.

Figure 3:
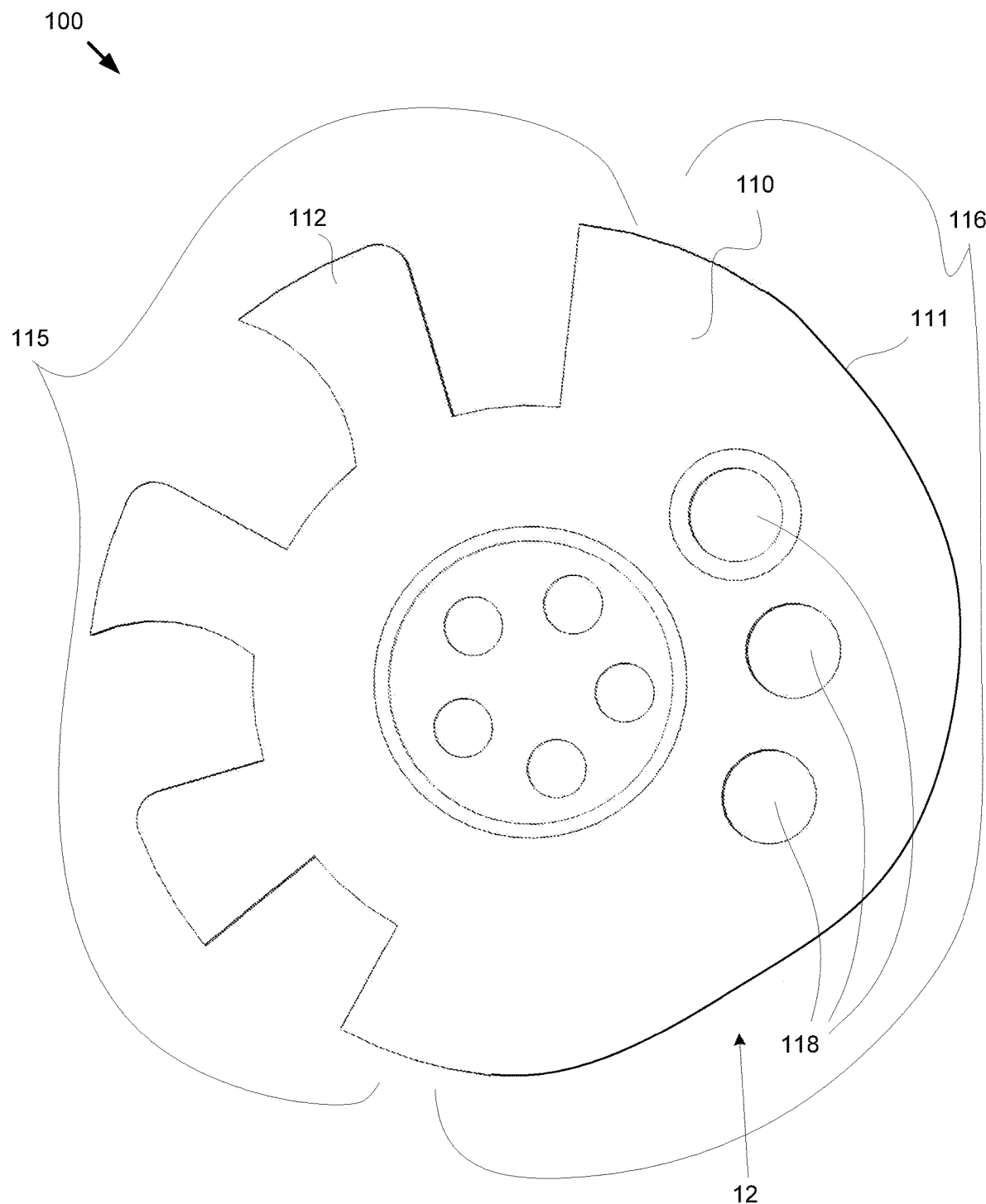
FIG. 3 is a side view of yet another embodiment of a wheel apparatus showing two circumferential regions, one with tread teeth and the other with no tread teeth.

FIG. 3 is a side view of yet another embodiment of a wheel apparatus 100 showing two circumferential regions 115, 116, one with tread teeth 112 and the other substantially lacking tread teeth 116. As described above, the peripheral edge 111 of the solid tire module 110 is at least formed with a plurality of tread teeth 112. However, the tread teeth 112 may only form a portion (i.e., region 115) of the peripheral edge 111 of the tire module 110 while another portion (i.e., region 116) may be substantially devoid of tread teeth 112. For example, the second region 116 may have substantially smaller tread teeth, serrations, or a rubber lining. In one embodiment, the rubber lining may extend axially beyond the axial thickness of the tire module 110 and may be supported by an axially extending support plate (not depicted). In another embodiment, as depicted in FIG. 3, the peripheral edge 111 of the wheel apparatus 100 may have a substantially flat portion 12, thus allowing a comparatively greater surface area to contact the terrain. In such an embodiment, the tread teeth 112 in the first circumferential region 115 can be used for traction while the second circumferential region 116 can be used for static support or braking procedures. As described in greater detail below with reference to FIGS. 6-9, the wheel apparatus 100 may be modified and implemented in various manners according to the specifics of a given application (e.g., based on the type of terrain or the type of vehicle).

In one embodiment, although not depicted, the solid tire module 110 may include spring-load features protruding from the peripheral edge 111. For example, the tire module 110, whether across the entire peripheral edge 111 or only a region 115, 116 of the peripheral edge, may include spring-loaded spikes or other terrain gripping features that can be compressed within apertures as needed. In another embodiment, the tread teeth 112 themselves may be spring-loaded or may include vibration/impact dampeners that absorb some of the contact force as the tire module 110 rolls along the terrain. Because the asymmetrical and/or non-uniform configuration of the tire module 110 may cause the axle to oscillate up and down as the apparatus 100 rolls along the terrain, spring-loaded teeth and/or vibration/impact dampeners may be beneficial to reduce the oscillations. Further, the apparatus 100 may be implemented in conjunction with a control system, as described in greater detail below.

In yet another embodiment, the tread teeth may be removable and replaceable, thus allowing a user to select the desired spatial specifications of the tread teeth 112 without having to remove the tire module 110 from the rim module 105 (in embodiments where such a detachment is possible) or without having to detach the entire apparatus 100 from the axle of a vehicle (once again, in embodiments where such a detachment is possible). FIG. 3 also depicts various bores 118 extending axially through the tire module 110. These bores 118, as described below with reference to FIG. 4, may be incorporated to balance the apparatus 100 and/or to reduce the weight of the apparatus 100.

Figure 4:
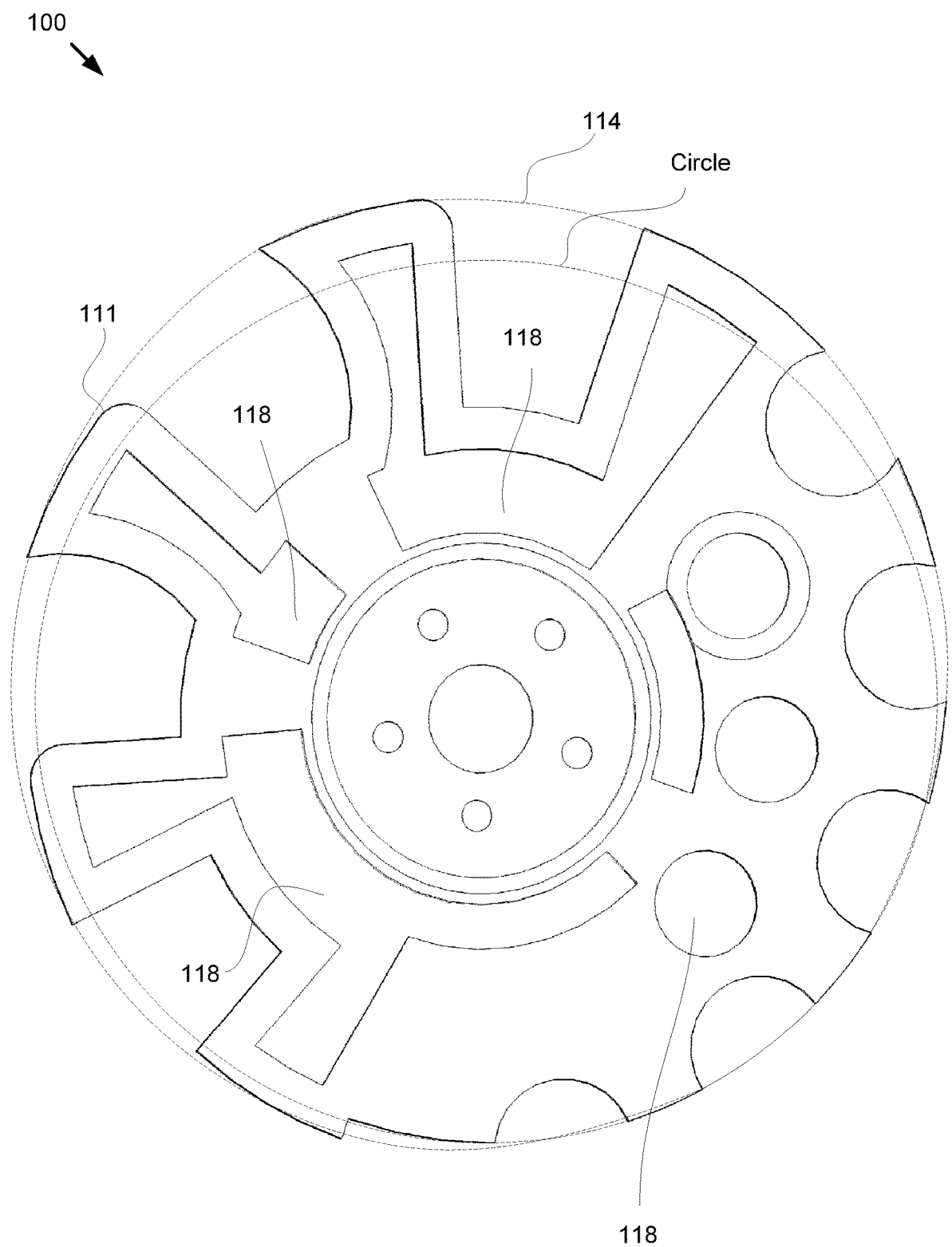
FIG. 4 is a side view of another embodiment of a wheel apparatus showing bores extending axially through the solid tire module.

FIG. 4 is a side view of another embodiment of a wheel apparatus 100 showing bores 118 extending axially through the solid tire module 110. As mentioned above, the solid tire module 110 may have bores 118 to enhance the balance of the apparatus 100. The bores 118 may be apertures, holes, or cut-outs that extend axially through the solid tire module 110. In another embodiment, the solid tire module 110 may also include indentations, notches, or partial-cut-outs to further balance the apparatus 100 and to reduce the weight of the apparatus 100.

FIG. 4 also contrasts one embodiment of the rotational trace 114 of the wheel apparatus 100 compared to a circle. The rotational trace 114 is the apparent peripheral shape of the apparatus 100 as it rotates about an axle. In other words, the rotational trace 114 does not represent the actual, physical profile of the tread teeth around the solid tire module but instead represents the shape of the tracing that tangentially contacts the radially outermost points of the peripheral edge 111 of the tire module 110. As depicted, the rotational trace 114, according to one embodiment, may be non-circular. Accordingly, the non-circular, asymmetrical rotational trace 114 may further enhance the traction of the apparatus 100. However, as mentioned above with reference to the non-uniformity of the tread teeth, the asymmetrical shape of the rotational trace 114 may cause the vehicle to experience vertical oscillations as the oblong wheel apparatus 100 rolls along the terrain. Accordingly, a control system may be implemented in conjunction with the apparatus 100, as described below.

Figure 5:
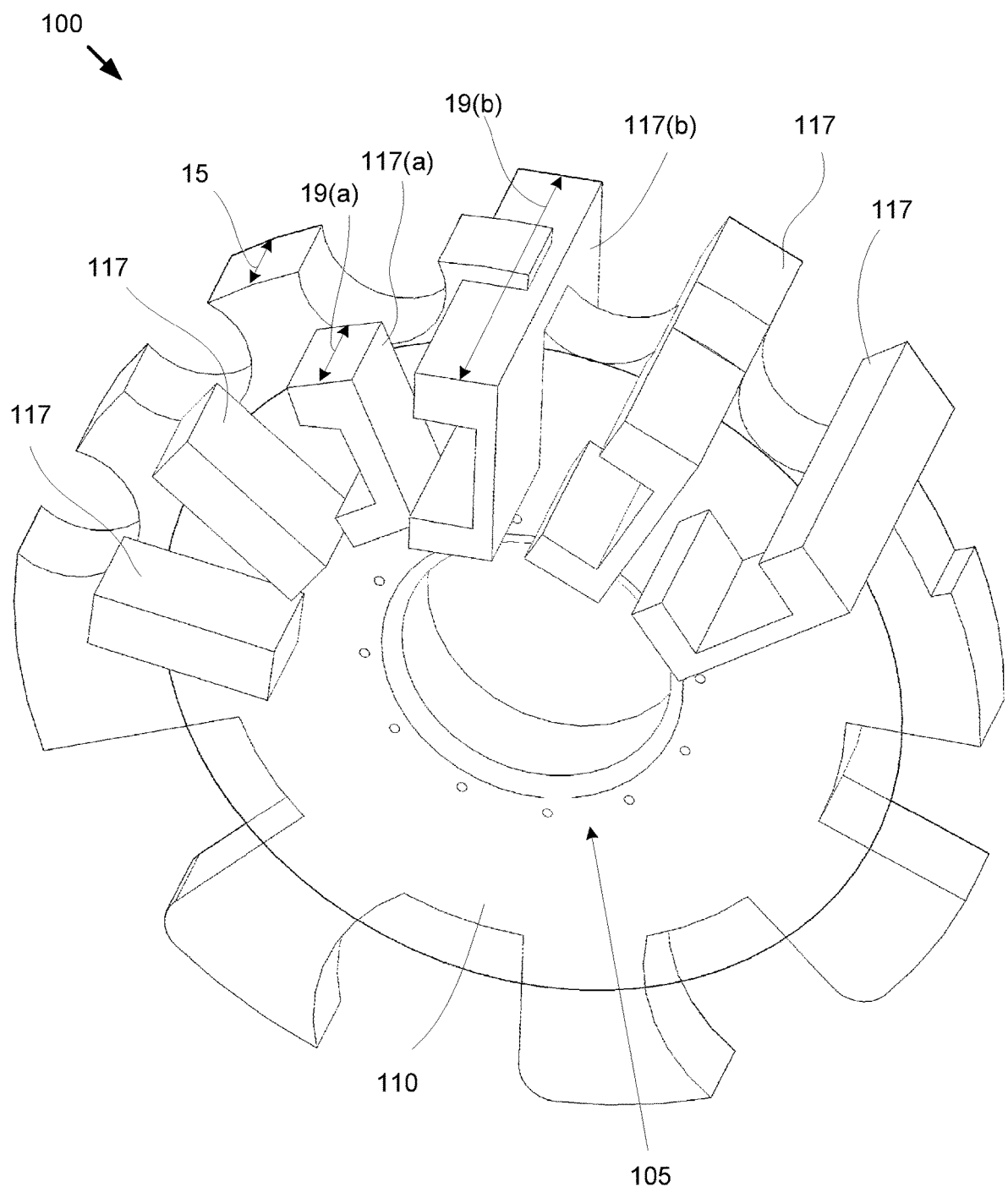
FIG. 5 is a perspective view of one embodiment of a wheel apparatus showing axial wings on the solid tire module.

FIG. 5 is a perspective view of one embodiment of a wheel apparatus 100 showing axial wings 117 on the solid tire module 110. The axial wings 117 extend axially outward from the solid tire module 110 to widen the effective contact surface area of the wheel apparatus 100 as it rotates. The axial wings 117 may further enhance traction, especially in situations where the terrain is loose or fluidic, such as snow, mud, and sand. Without axial wings, the tire module 110 and the plurality of tread teeth 112 may sink into the loose or fluidic terrain because the axial thickness 15 is too narrow to support the weight of the vehicle. However, when axial wings 117 are implemented, the axial breadth 19 of said wings 117 may enhance the traction of the wheel apparatus 100, thus allowing a vehicle to propel itself out of loose or fluidic terrain.

In one embodiment, the axial wings 117(a) may only extend from one side of the tire module 110. In another embodiment, the axial wings 117(b) may extend on both sides of the tire module 110, either coupled to both sides of the tire module 110 or extending through the tire module 110 itself. The wheel apparatus 100 may be implemented with a single axial wing 117 or multiple axial wings 117. In one embodiment, at least a portion/region of the axial wings 117 may sequentially increase in axial breadth. In other words, the axial breadth 19(b) of a second axial wing 117(b) may be greater than the axial breadth 19(a) of a first axial wing 117(a). Also, the axial wings 117 may not be positioned around the whole tire module 110 but may instead occupy only a circumferential region of the tire module 110. Further, the axial wings 117 themselves may have terrain gripping features to enhance the traction of the wheel apparatus 100. For example, as depicted, at least a portion of the axial wings 117 may have a concave structure, thus increasing the traction bite of the wheel apparatus 100 on loose or fluidic terrains.

FIG. 6 is schematic block diagram of one embodiment of a wheel system 300 coupleable to a vehicle. The wheel system 300 includes a wheel apparatus 100, as described above with reference to FIGS. 1-5, and a terrain engagement subsystem 200. The terrain engagement subsystem 200 includes a power module 210 that receives power from a power source. The power source may generate or store electrical energy, hydraulic energy, pneumatic energy, or rotational kinetic energy, among others. In one embodiment, the power source may be an existing power source of the vehicle (i.e., a hydrocarbon powertrain engine, or a hybrid engine system). In another embodiment, the wheel system 300 may actually include a power source that is separate from the powertrain engine of the vehicle. Depending on the implementation details of a specific application, the power source may need to generate (or at least be geared to generate) high torque at comparatively low speeds. In one embodiment, the wheel system 300 may be a retro-fit application that is installable on an existing vehicle. In another embodiment, the wheel system 300 may be implemented by an original manufacture as part of a new product/vehicle.

As mentioned above and as described in greater detail below, the non-uniformity of the tread teeth 112 and/or the asymmetrical rotational trace 114 of the wheel apparatus 100 may warrant low speed rotation of the wheel apparatus to successfully traverse the terrain and to minimize the severity of the vertical oscillations. The wheel system 300 may be monitored and controlled via a controller 400. The controller 400, as described below in greater detail, may be a sub-module of the main electronic control module of the vehicle or the controller 400 may be an independent module. The controller 400 may include various sensors and communication lines, as depicted in FIG. 6, that regulate and control the operation of the system 300. Once again, additional details regarding the controller 400 are included below with reference to FIG. 10.

The power module 210 is configured to receive energy, whether electrical, hydraulic, or pneumatic, to rotate the axle 230. The axle 230 may be a standard, rotating member supported via bearings. The axle 230 may not extend across the entire width of the vehicle and may only have a short length. The axle 230 is connected to the wheel apparatus 100 via the rim module 105, thereby transferring power from the power source to the wheel apparatus 100 to propel the vehicle over the terrain. In another embodiment, the axle 230 may be operably connected to a gearing assembly, hub, or transmission. The terrain engagement subsystem 200 may further include an actuation mechanism 240. The actuation mechanism 240 controls whether the wheel apparatus 100 is in a drive-mode or a passive-mode. These two modes, as well as further details relating to the actuation mechanism, are included below with reference to FIG. 7.

In one embodiment, the wheel system 300 of the present disclosure may also be used for other purposes, such as a winch system or a digger/trencher system. For example, the high-torque delivered to the axle may be used as a winch system to pull other vehicles. In another example, the plurality of traction tread teeth 112 may be replaced (e.g., by detaching the tread teeth 112 alone, detaching the tire module 110 from the rim module 105, or detaching the entire wheel apparatus 100) with digger/trencher teeth to promote cutting through the terrain. Further, as described briefly above, the tire module 110 may include a region substantially lacking tread teeth (see FIG. 3) and thus the wheel system 300 may be used and actuated to support the vehicle in a stable position or to function as a brake to prevent the vehicle from moving along the terrain.

FIG. 7 depicts one embodiment of a terrain engagement subsystem 200 coupled to a vehicle. The vehicle, although depicted as a truck, may be any vehicle that may be used in off-road or rough terrain applications. For example, it is anticipated that the wheel system 300 may be implemented on a car, dune-buggy, all-terrain vehicle, motorcycle, tractor, military vehicle, or recreational vehicle, among others. It is further anticipated that the wheel system 300 may also be implemented on vehicles that do not have an active powertrain engine, such as trailers and other towed carriers. In such embodiments, the power module 210 of the terrain engagement system 200 may transfer power (e.g., hydraulic lines) across a hitch to an axle 230, actuation mechanism 240, and wheel apparatus 100 coupled to the chassis of a trailer.

The terrain engagement subsystem 200 includes an actuation mechanism 240 that operably actuates the axle 230 and the wheel apparatus 100 (not depicted in FIG. 7) to be in drive-mode or passive-mode. Drive-mode is a condition where the wheel apparatus 100 is ready and able to rotatably exert a force on the terrain and propel the vehicle while passive-mode is where the wheel apparatus 100 is either not in contact with the terrain or the wheel apparatus 100 is not operably geared to the power source (i.e., the wheel apparatus spins freely as the primary powertrain of the vehicle is engaged). Accordingly, in one embodiment the terrain engagement subsystem 200 includes an actuation mechanism 240 that is an extension arm 242. The extension arm 242 may have a telescoping assembly or a pivoting swing arm assembly (as depicted in FIG. 7) that can be lowered, for example by hydraulics, to engage the terrain.

In another embodiment, although not depicted, the wheel apparatus 100 may be in constant contact with the terrain but the axle 230 may include a gearing assembly that allows the wheel apparatus 100 to be disengaged from the power supply (i.e., in neutral), thus allowing wheel apparatus 100 to freely rotate. As needed, the speed and/or torque of the axle 230 may be adjusted using a gearing assembly/hub to facilitate pushing or pulling the vehicle over the terrain. In one embodiment, the actuation mechanism 240 may include both an extension arm 242 and the axle 230 may include a gearing assembly/hub, among other components, for controlling the system. In one embodiment, the actuation mechanism 240 may extend in front of the vehicle or behind the vehicle (or both) to pull and push, respectively, the vehicle across the terrain.

Figure 8:
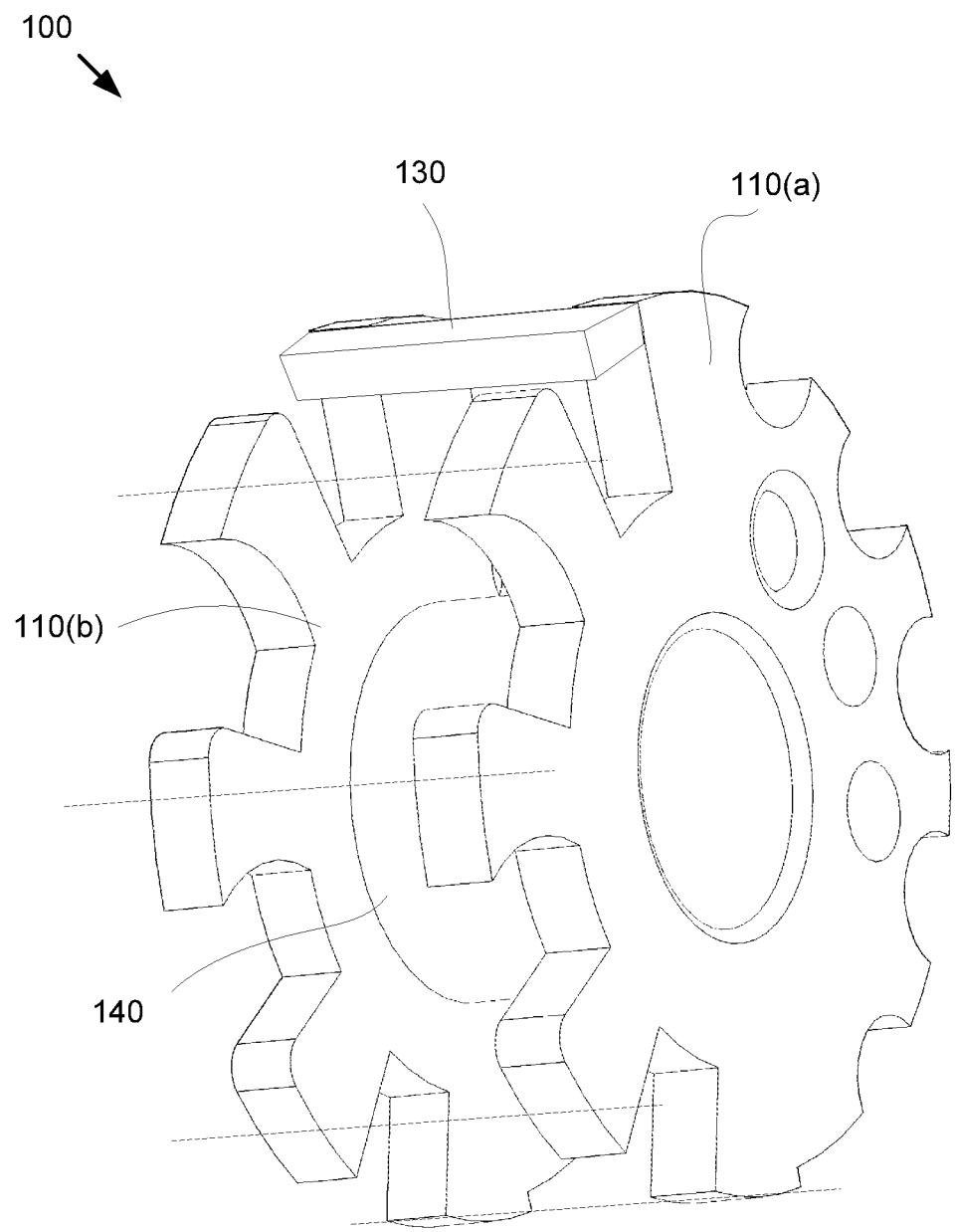
FIG. 8 is a perspective view of one embodiment of a wheel apparatus showing a paddle extending between two solid tire modules rotated by single axle hub.

FIG. 8 is a perspective view of one embodiment of a wheel apparatus 100 showing two solid tire modules 110(a), 110(b) on one or more rim modules 105. The wheel apparatus 100 may be implemented with two or more tire module plates 110(a), 110(b) to allow users to further customize the wheel apparatus 100 according to their traction needs. Although only two tire modules 110(a), 110(b) are depicted in FIG. 8, it is anticipated that more than two tire modules may be implemented, according to the specifics of a given application. FIG. 8 also depicts a paddle 130 that extends axially between the two tire modules 110(a), 110(b). Although a single paddle 130 is depicted, it is anticipated that multiple paddles may be implemented. For example, a paddle 130 may be attached to each tread tooth 112. In another embodiment, the paddles 130 may be integrally formed with the tire module 110 instead of being detachably coupled thereto. The size and specifications of the paddles 130 may vary, once again depending on the specifics of a given application. For example, the paddles 130 may extend the entire radial height of the tread teeth and/or may extend axially beyond tread teeth (similar to the wings described above). Additionally, the paddle(s) 130 may include terrain gripping features, such as spikes, coatings, apertures, etc.

FIG. 8 also shows various dotted lines showing the alignment of the tread teeth 112 between the two tire modules 110(a), 110(b). In one embodiment, as depicted, the tread teeth may be purposefully aligned to enhance the traction of the wheel apparatus 100. However, in another embodiment the tread teeth 112 may be intentionally counter-aligned (not depicted) to decrease the vertical oscillations caused by the asymmetrical rotational trace 114 of the tire modules. In one embodiment, the counter-alignment of the tire modules 110 may also benefit the smoothness of the ride of the vehicle. In other words, as described above, since the rotational trace 114 of each tire module is oblong/asymmetrical, the vehicle may experience vertical oscillations as the wheel apparatus rolls along the terrain. When two or more tire modules are counter aligned, the combined rotational traces of the multiple tire modules may result in comparatively more circular composite rotational trace, thus decreasing the vertical oscillation.

In another embodiment, the connection member 140 between the two tire modules 110(a), 110(b) may be coated with a rubber material or may have the radial thickness altered to control the sinking depth of the tread teeth 112. For example, if a vehicle was traversing a substantially rocky or debris covered terrain, the wheel apparatus may benefit from having tread teeth with long radial height. However, upon encountering a different terrain or upon crossing a muddy or snowy area, the tread teeth may actually dig into the loose or fluidic terrain, thus causing the tire module to sink. Accordingly, the connecting member 140 may be replaceable, customizable, and/or radially adjustable, thus allowing a user to select the effective radial height of the tread teeth. In another embodiment, a rubber tire with an air bladder/tube may be implemented in conjunction with the connecting member 140, thus limiting the penetration of the tread teeth and increasing flotation/buoyancy of the wheel system 300. Additionally, the embodiment of the connecting member 140 with an air bladder/tube may allow a user to adjust the pressure within the air bladder, thus expanding the radial dimension of the connecting member and adjusting the sinking depth of the wheel system 300.

In one embodiment, the wheel system 300 may include a tandem axle power drive. A tandem axle power drive may have 2 tandem axles each with two wheel apparatuses 100. In such an embodiment, for example, circumferential regions of the solid tire modules 110 that have more aggressive tread teeth 112 may be offset on the different wheel apparatuses 100, thus allowing the more aggressive tread teeth region of at least one of the solid tire modules 110 to be in substantially constant contact with the terrain. The tandem axle power drive may include a hub motor mounted to the tandem axle configuration in conjunction with a belt or chain to synchronize the rotation of the wheel apparatuses 100. Not only would such a configuration potentially increase the traction of the vehicle (because at least one circumferential region of aggressive tread teeth is constantly engaged with the terrain), the tandem axle power drive may further dampen the vertical oscillation caused by the asymmetrical, non-circular wheel apparatuses 100 because the tandem beam could pivot and absorb much of the up and down oscillatory motion. Accordingly, a control system implemented with the tandem axle drive may be comparatively less complex.

FIG. 9 is a perspective view of one embodiment of a solid tire module 110 that can be attached to a rim module 105 that is attached to an existing wheel 50. As mentioned above, the rim module 105 is the base to which the solid tire module 110 is attached. In one embodiment, as depicted in FIG. 9, the existing wheel 50 has a solid (e.g., steel) rim 52 and may include an existing tire 54 mounted thereto. Accordingly, the rim module 105 may anchor to the solid rim 52 of the existing wheel 50 via bolts, welding, or other attachment means. The rim module 105 may also include mounting elements 106, such as threaded bolt apertures or other attachment facilitator means, which can be securely engaged to corresponding mounting elements 107 (e.g., bolts) on the solid tire module 110.

In one embodiment, the tire 54 may be modified so that certain tread sections 51 are removed, thus allowing the tread teeth 112 of the solid tire module 110 to take the place of the removed tread sections 51. Further, although the solid tire module 110 and the rim module 105 depicted in FIG. 9 are shown as arced sections of material that do not span 360 degrees around, it is anticipated that in other embodiments the rim module 105 and the solid tire module 110 may extend substantially 360 degrees. In such embodiments, for example, the existing wheel 50 may include a tire 54 that has worn out tread and the attached solid tire module 110 may comprise a new terrain engaging surface. Accordingly, the wheel apparatus 100 may be implemented as a retrofit application to renew/reuse existing wheels 50 that have balding tire tread 54.

In one embodiment, although not depicted, two rim modules 105 may be attached to opposite sides of the solid rim 52 of the existing wheel 50. In such an embodiment, the solid tire module 110 may include solid shafts, such as reinforcing bars ("rebar"), that extend axially across the surface of the existing tire 54 (may have a diminished or balding tread pattern) and attach to the rim modules 105 on both sides of the existing wheel 50. The solid shafts may form the tread teeth 112 of the solid tire module 110. Accordingly, the solid shafts used as the tread teeth may have various circumferences, thus enhancing the traction of the wheel apparatus 100, as described above.

Figure 10A:
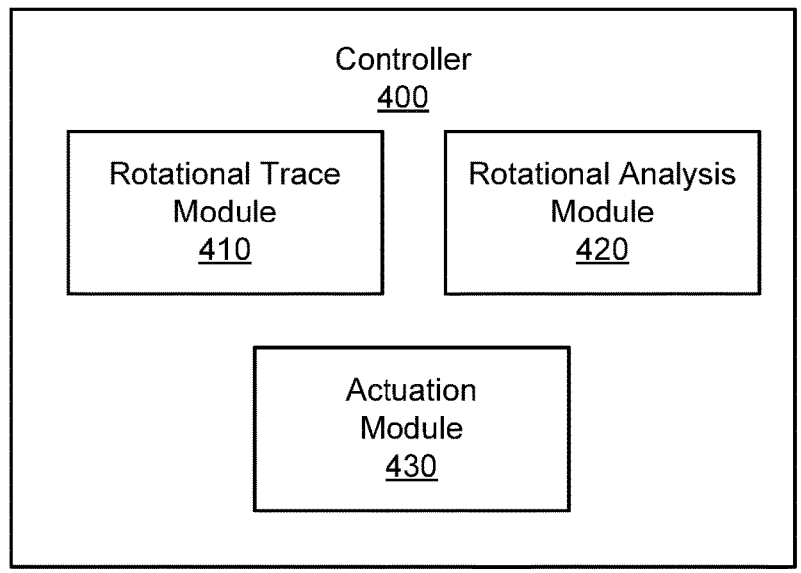
FIG. 10A is a schematic block diagram of one embodiment of a controller apparatus.

FIG. 10A is a schematic block diagram of one embodiment of a controller apparatus 400. As described briefly above with reference to FIG. 6, the controller apparatus 400 controls the operation of the wheel system 300 (including the terrain engagement subsystem 200 and the wheel apparatus 100). Further, the controller apparatus 400 may also control, or at least contribute to the control of, existing powertrain systems of the vehicle. The controller apparatus 400 includes a rotational trace module 410, a rotational analysis module 420, and an actuation module 430.

The rotational trace module 410 receives information regarding the non-circular rotational trace 114 (as defined above) of any wheel apparatuses 100 implemented on a vehicle. The receipt of this information may occur via the use of scanners that detect the rotational trace 114 of the wheel apparatuses 100 or via manually user input. For example, a user may manually enter the dimensions of the wheel apparatuses 100 rotational trace or the user may enter a serial number(s) for the wheel apparatus 100, wherein the controller may use the serial number to request, download, or lookup the dimensions of the wheel apparatus 100. Once the information is received, the rotational trace module 410 generates rotational trace data that is sent to the rotational analysis module 420.

The rotational analysis module 420 receives the rotational trace data and generates a reduced oscillation strategy. As described above, since the rotational trace 114 of the wheel apparatus 100 is asymmetrical, uncontrolled rotation of the wheel apparatus 100 causes the vehicle and any onboard operators and/or equipment to experience repeated vertical oscillations. With a non-circular wheel, the axle is offset from the center (or in other words the radial distance from the axle to the peripheral edge of the tire module is not uniform), thus causing the vehicle to experience repeated, oscillating vertical displacement. The rotational analysis module 420 considers the controllable actuators that the controller 400 has access to, such as variable suspension, axle motor speed, gearing assemblies, and spring-loaded elements, among others. The rotational analysis module 420 generates a reduced oscillation strategy and sends the strategy to the actuation module 430 for implementation/actuation.

The actuation module 430 receives the reduced oscillation strategy and sends actuation commands to controllable actuators. As described above, the controllable actuators of the powertrain system may include elements and components of the existing vehicle powertrain system or elements and components of the terrain engagement subsystem 200 (e.g., the power module 210, axle 230, and/or actuation mechanism 240).

Figure 10B:
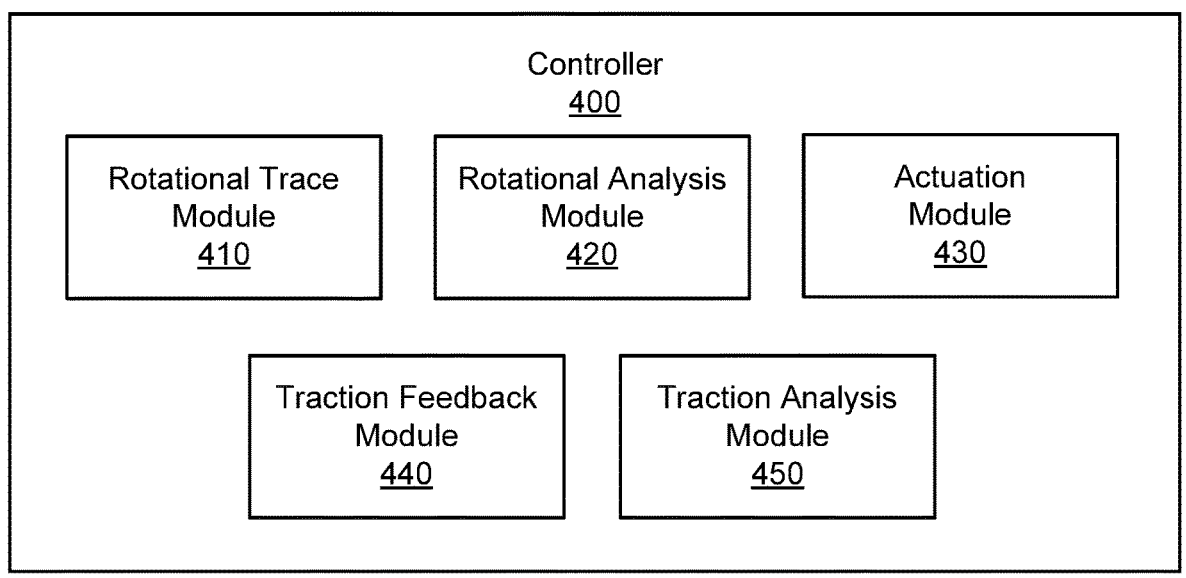
FIG. 10B is a schematic block diagram of another embodiment of a controller apparatus.

FIG. 10B is a schematic block diagram of another embodiment of a controller apparatus 400. The controller apparatus depicted in FIG. 10B includes a rotational trace module 410, a rotational analysis module 420, an actuation module 430, a traction feedback module 440, and a traction analysis module 450. The rotational trace module 410, the rotational analysis module 420, and the actuation module 430 were described above with reference to FIG. 10A.

Generally, the traction feedback module 440 detects the condition of the powertrain system of the vehicle. As mentioned above, the powertrain system is defined as any powertrain components of the existing vehicle or of the wheel system 300 (terrain engagement subsystem 200). For example, power sources, generators, engines, motors, suspension systems, gearing assemblies, and axles, among others, are examples of powertrain components. Accordingly, the traction feedback module 440 may use sensors and detectors to comprehend the condition of the powertrain system. For example, rotational speed sensors, suspension monitors, torque sensors, voltage meters, current meters, hydraulic pressure meters, accelerometers, etc., may be utilized by the traction feedback module 440 to detect the condition of the powertrain system. In one embodiment, a speed sensor may report that the one of the axles/wheels is spinning at a rate that indicates the wheel is losing traction. In another embodiment, a suspension monitor and/or an accelerometer may report that the vehicle is experiencing vertical oscillations. The traction feedback module 440 reports these conditions to the traction analysis module 450.

The traction analysis module 450 analyzes the powertrain condition report from the traction feedback module 440 and generates a traction control strategy that is sent to the actuation module 430 (described above). The actuation module 430 considers both the reduced oscillation strategy and the traction control strategy and sends out actuation commands to the various actuators accordingly. In one embodiment, the actuation commands may include locking up the vehicle's suspension. In another embodiment, the actuation commands may include directing the actuation mechanism 240 to switch the wheel system 300 between drive-mode and passive-mode. In yet another embodiment, the actuation command may include increasing or decreasing the rotational speed of the wheel apparatus 100 or gearing the wheel apparatus 100 in such a manner so as to increase the torque.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise.

An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The controller 400 of the present disclosure may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A wheel system, comprising:
a terrain engagement subsystem mountable to a vehicle, the terrain engagement subsystem comprising:
a power module operably connectable with a power source, the power module engaged with an axle, wherein the axle is rotatably driven via the power module, and an actuation mechanism that controls whether a wheel apparatus is in drive-mode or passive-mode;
the wheel apparatus comprising:
a first rim module coupled to the axle;
a first solid tire module extending from the first rim module, the first solid tire module comprising:
a first plurality of tread teeth that form a peripheral edge, the peripheral edge forming at least a portion of a tire profile, wherein each tread tooth of the first plurality of tread teeth comprises a spatial specification comprising a circumferential width, a radial height, an edge shape, and a circumferential gap width, wherein the spatial specification of the first plurality of tread teeth is non-uniform,
a second rim module,
a second solid tire module comprising a second plurality of tread teeth that form a peripheral edge, wherein each tread tooth of the second plurality of tread teeth comprises a spatial specification comprising a circumferential width, a radial height, an edge shape, and a circumferential gap width, wherein the spatial specification of the second plurality of tread teeth is non-uniform, and
at least one paddle axially extending between the first solid tire module and the second solid tire module.

2. The wheel system of claim 1, wherein the spatial specification of the first plurality of tread teeth of the first solid tire module is substantially the same as, and aligned with, the spatial specification of the second plurality of tread teeth of the second solid tire module.

3. The wheel system of claim 1, wherein the spatial specification of the first plurality of tread teeth of the first solid tire module is substantially the same as, but counter-aligned with, the spatial specification of the second plurality of tread teeth of the second solid tire module.

4. The wheel system of claim 1, wherein the actuation mechanism of the terrain engagement-subsystem comprises an extension arm that extends the first solid tire module into contact with terrain in drive-mode and retracts the first solid tire module from contact with the terrain in passive-mode.

5. The wheel system of claim 4, wherein the extension arm positions the first solid tire module between at least two axles of a vehicle comprising the at least two axles.

* * * * *